US012791681B2

(12) United States Patent
Tachwali et al.

(10) Patent No.: US 12,791,681 B2
(45) Date of Patent: Nov. 10, 2026

(54) LIDAR RANGE ENHANCEMENT USING PULSE CODING

(71) Applicant: LG INNOTEK CO., LTD., Seoul (KR)

(72) Inventors: Yahia Tachwali, Princeton, NJ (US); Mark Itzler, Princeton, NJ (US); Samuel Richard Wilton, Levittown, PA (US); Gennaro Salzano, Monroe Township, NJ (US)

(73) Assignee: LG INNOTEK CO., LTD., Seoul (KR)

( * ) Notice: Subject to any disclaimer, the term of this patent is extended or adjusted under 35 U.S.C. 154(b) by 986 days.

(21) Appl. No.: 17/738,797

(22) Filed: May 6, 2022

(65) Prior Publication Data

US 2023/0358865 A1 Nov. 9, 2023

(51) Int. Cl.

| | |
|---|---|
| ***G01S 7/48*** | (2006.01) |
| ***G01S 7/481*** | (2006.01) |
| ***G01S 7/4865*** | (2020.01) |
| ***G01S 17/931*** | (2020.01) |

(52) U.S. Cl.

CPC .......... *G01S 7/4865* (2013.01); *G01S 7/4814* (2013.01); *G01S 7/4816* (2013.01); *G01S 17/931* (2020.01)

(58) Field of Classification Search

None

See application file for complete search history.

(56) References Cited

U.S. PATENT DOCUMENTS

| | | | |
|---|---|---|---|
| 7,858,917 | B2 | 12/2010 | Stern et al. |
| 8,106,422 | B2 | 1/2012 | Veliadis |
| 9,069,060 | B1 | 6/2015 | Zbrozek et al. |
| 9,299,731 | B1 | 3/2016 | Lenius et al. |
| 9,304,203 | B1 | 4/2016 | Droz et al. |
| 9,625,580 | B2 | 4/2017 | Kotelnikov et al. |
| 9,899,544 | B1 | 2/2018 | Mazzillo et al. |
| 9,911,774 | B2 | 3/2018 | Grzesik |
| 10,018,505 | B2 | 7/2018 | Clemens et al. |

(Continued)

FOREIGN PATENT DOCUMENTS

| | | | |
|---|---|---|---|
| CN | 109116328 | A | 1/2019 |
| CN | 110114694 | A | 8/2019 |

(Continued)

OTHER PUBLICATIONS

English Abstract for CN 109116328 A, published on Jan. 1, 2019, downloaded from https://worldwide.espacenet.com on May 13, 2022, 1 page.

(Continued)

*Primary Examiner* — Hovhannes Baghdasaryan

(74) *Attorney, Agent, or Firm* — Birch, Stewart, Kolasch & Birch, LLP

(57) ABSTRACT

A temporal pulse coding scheme is disclosed for use in operating pulsed lidar systems, and in particular, pulsed lidar systems used as sensors on autonomous vehicles. Pulse coding can be implemented to eliminate range ambiguity due to aliasing effects. Alternatively, pulse coding can be used with cyclic re-mapping to extend the maximum range of the lidar detector. Pulse coding can be further combined with arm coding to make range determinations over a continuous range having no dead zones.

20 Claims, 14 Drawing Sheets

(56) References Cited

U.S. PATENT DOCUMENTS

| | | | |
|---|---|---|---|
| 10,094,925 | B1 | 10/2018 | LaChapelle |
| 10,109,671 | B2 | 10/2018 | Donnelly et al. |
| 10,177,181 | B2 | 1/2019 | Grzesik |
| 10,205,036 | B2 | 2/2019 | Mazzillo et al. |
| 10,234,546 | B2 | 3/2019 | Droz et al. |
| 10,247,811 | B2 | 4/2019 | Clifton |
| 10,379,540 | B2 | 8/2019 | Droz et al. |
| 10,466,342 | B1 | 11/2019 | Zhu et al. |
| 10,620,302 | B2 | 4/2020 | Zhu et al. |
| 10,627,490 | B2 | 4/2020 | Hall et al. |
| 10,700,220 | B2 | 6/2020 | Mazzillo et al. |
| 10,845,467 | B2 | 11/2020 | Axelsson |
| 2005/0169646 | A1 | 8/2005 | Bondurant et al. |
| 2018/0259645 | A1 | 9/2018 | Shu et al. |
| 2018/0284240 | A1 | 10/2018 | LaChapelle et al. |
| 2018/0284280 | A1 | 10/2018 | Eichenholz et al. |
| 2018/0372850 | A1 | 12/2018 | Frederiksen et al. |
| 2019/0131480 | A1 | 5/2019 | Singh et al. |
| 2020/0044098 | A1 | 2/2020 | Azuma et al. |
| 2020/0370954 | A1 | 11/2020 | Fujita et al. |
| 2021/0124027 | A1 * | 4/2021 | Holzhüter ............... G01S 7/487 |

FOREIGN PATENT DOCUMENTS

| | | | |
|---|---|---|---|
| DE | 102017210684 | A1 | 12/2018 |
| JP | 2021092543 | | 6/2021 |
| WO | WO 2016/167753 | A1 | 10/2016 |
| WO | WO 2018/0183715 | A1 | 10/2018 |
| WO | WO 2019/046581 | A1 | 3/2019 |
| WO | WO 2019/146725 | A1 | 8/2019 |
| WO | WO 2020/251787 | A1 | 5/2020 |
| WO | WO 2020/223561 | A1 | 11/2020 |
| WO | WO 2021/077096 | A1 | 4/2021 |

OTHER PUBLICATIONS

English Abstract for CN 110114694 A, published on Aug. 9, 2019, downloaded from https://worldwide.espacenet.com on May 13, 2022, 1 page.

English Abstract for DE 102017210684 A1, published on Dec. 27, 2018, downloaded from https://worldwide.espacenet.com on May 13, 2022, 1 page.

Japanese Office Action for Japanese Application No. 2024-565310, dated Nov. 4, 2025, with English translation.

* cited by examiner

| N | Pulse codes |
|---|---|
| 12 | 1, 7, 12, 16, 19, 21, 22, 21, 19, 16, 12, 7 |
| 13 | 1, 8, 14, 19, 23, 26, 28, 29, 28, 26, 23, 19, 14 |
| 16 | 1, 9, 16, 22, 27, 31, 34, 36, 37, 36, 34, 31, 27, 22, 16, 9 |
| 30 | 1, 16, 30, 43, 55, 66, 76, 85, 93, 100, 106, 111, 115, 118, 120, 121, 120, 118, 115, 111, 106, 100, 93, 85, 76, 66, 55, 43, 30, 16 |

Fig. 11

LIDAR RANGE ENHANCEMENT USING PULSE CODING

BACKGROUND

Light Detection and Ranging (lidar) technology provides a way to directly measure a distance of objects from a lidar sensor. A lidar apparatus generally includes an emitter and a receiver, or sensor, co-located in the same housing. The lidar emitter emits light, e.g., a pulsed laser beam, which reflects from objects in its path. Reflected light is then detected by the lidar sensor, and the detected signal is analyzed to determine a range of the object, or target, that is, the distance between the target and the lidar sensor. Such lidar range measurements are inherently limited by a transmission delay—the time required for a light pulse to travel a round trip distance between the detector and the target, or time-of-flight (TOF). Given the speed of light in air, the round trip signal TOF is 0.67 microseconds for every 100 m of distance between the sensor and the target.

The lidar emitter may emit repeated laser beam pulses at a fixed pulse emission rate. When a pulse is emitted, the detector may be activated, or "armed," for a time interval t, to detect TOF reflections of that pulse. After an activation time t, the detector is disarmed. Each time interval during which the detector is armed is referred to as a "range gate." The time interval dedicated to each complete TOF measurement is referred to as a "lidar frame."

The frame duration limits the TOF, and therefore the range, of detectable objects, to less than a maximum range, $R_{max}$, or equivalently, to within a measurable range window, $0 \le R \le R_{max}$. The lidar detector is generally armed for a finite period of time corresponding to $R_{max}$. For example, if a lidar emits a single light pulse and the detector is armed for 2 μs, the light sensor will detect only return signals having a time-of-flight of 2 μs or less, corresponding to a maximum range of 300 m. Light reflecting from objects farther away than 300 m will not have time to make a round trip back to the detector before the end of the range gate, and the detector disarms.

An aliasing effect can arise when a series of light pulses is emitted and the detector is repeatedly armed in accordance with the pulse frequency. When an emitted pulse is reflected from a distant target beyond $R_{max}$, the reflected signal may be detected in a subsequent lidar frame. The detected signal from the distant target may be misinterpreted as a reflection of a later pulse from a closer target. Aliasing thus arises because the detector cannot distinguish which pulse generated the reflected signal.

SUMMARY

Disclosed herein, in accordance with aspects, are systems, methods, and computer program products for receiving, by a lidar detector during a lidar frame, a reflected laser signal corresponding to a laser pulse emitted by a lidar emitter, wherein the received reflected laser signal is associated with a time bin of the lidar frame and with a pulse code offset applied to a laser signal emitted during that lidar frame. The received reflected laser signal is aggregated into an avalanche histogram at a time bin of the avalanche histogram corresponding with the time bin of the lidar frame, wherein one or more additional received reflected laser signals are further aggregated into the avalanche histogram at corresponding time bins of the avalanche histogram as a set of received reflected laser signals, each of the one or more additional received reflected laser signals having a corresponding pulse code offset. The set of received reflected laser signals is decoded by shifting each received reflected laser signal of the set of received reflected laser signals to a time bin of a decoded avalanche histogram based on the corresponding pulse code offset.

BRIEF DESCRIPTION OF THE DRAWINGS

The accompanying drawings are incorporated herein and form a part of the specification. It is noted that, in accordance with common practice in the industry, various features are not drawn to scale. Dimensions of the various features may be arbitrarily increased or reduced for clarity of discussion.

FIG. 11 is a chart illustrating an example of pulse codes, in accordance with aspects of the disclosure.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product aspects, and/or combinations and sub-combinations thereof, for range enhancement using pulse coding.

Range ambiguity due to aliasing can be eliminated by detecting only pulses that were emitted in the current frame. One way to distinguish pulses is by identifying them electronically using pulse modulation. A temporal pulse coding scheme is disclosed herein for application to pulsed lidar systems, and in particular, pulsed lidar systems used as sensors on autonomous vehicles. The temporal pulse coding scheme can be used to eliminate lidar aliasing effects through the use of avalanche histograms and appropriate pulse decoding techniques. Alternatively, pulse coding can be used to leverage aliased measurements to extend the dynamic range of the lidar system. That is, instead of discarding reflected signals from distant objects that are identified as being associated with laser pulses emitted during a previous lidar frame, this information is retained and used to calculate the range of the distant objects, thus effectively increasing the $R_{max}$ to arbitrarily large ranges. In addition, pulse coding can be combined with arm coding to eliminate dead zones during times when the detector is disarmed.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

Figure 1:
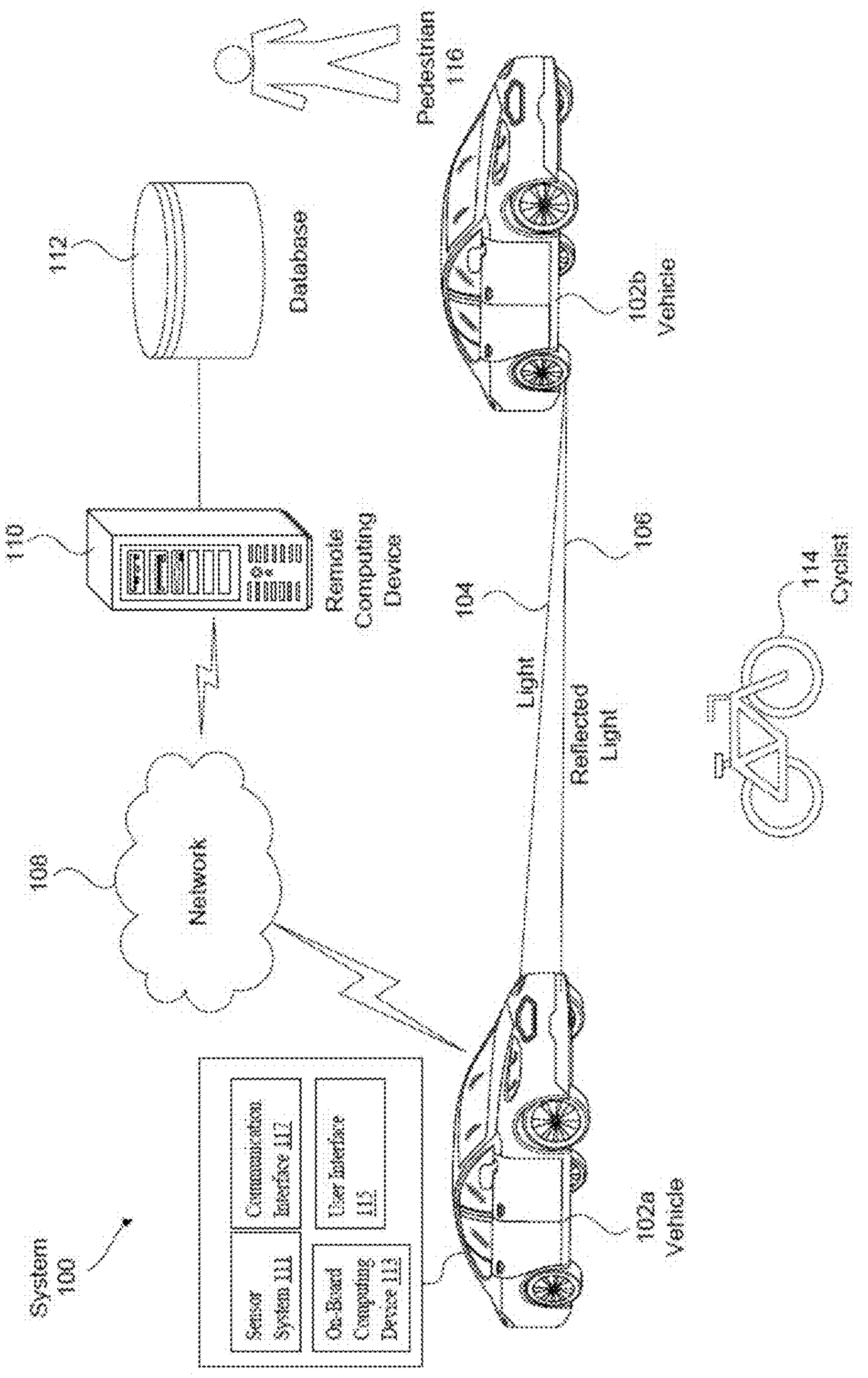
FIG. 1 illustrates an exemplary autonomous vehicle system, in accordance with aspects of the disclosure.

FIG. 1 illustrates an exemplary autonomous vehicle system 100, in accordance with aspects of the disclosure. System 100 comprises a vehicle 102*a* that is traveling along a road in a semi-autonomous or autonomous manner. Vehicle 102*a* is also referred to herein as AV 102*a*. AV 102*a* can include, but is not limited to, a land vehicle (as shown in FIG. 1), an aircraft, or a watercraft.

AV 102*a* is generally configured to detect objects 102*b*, 114, 116 in proximity thereto. The objects can include, but are not limited to, a vehicle 102*b*, cyclist 114 (such as a rider of a bicycle, electric scooter, motorcycle, or the like) and/or a pedestrian 116.

As illustrated in FIG. 1, the AV 102*a* may include a sensor system 111, an on-board computing device 113, a communications interface 117, and a user interface 115. Autonomous vehicle 101 may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
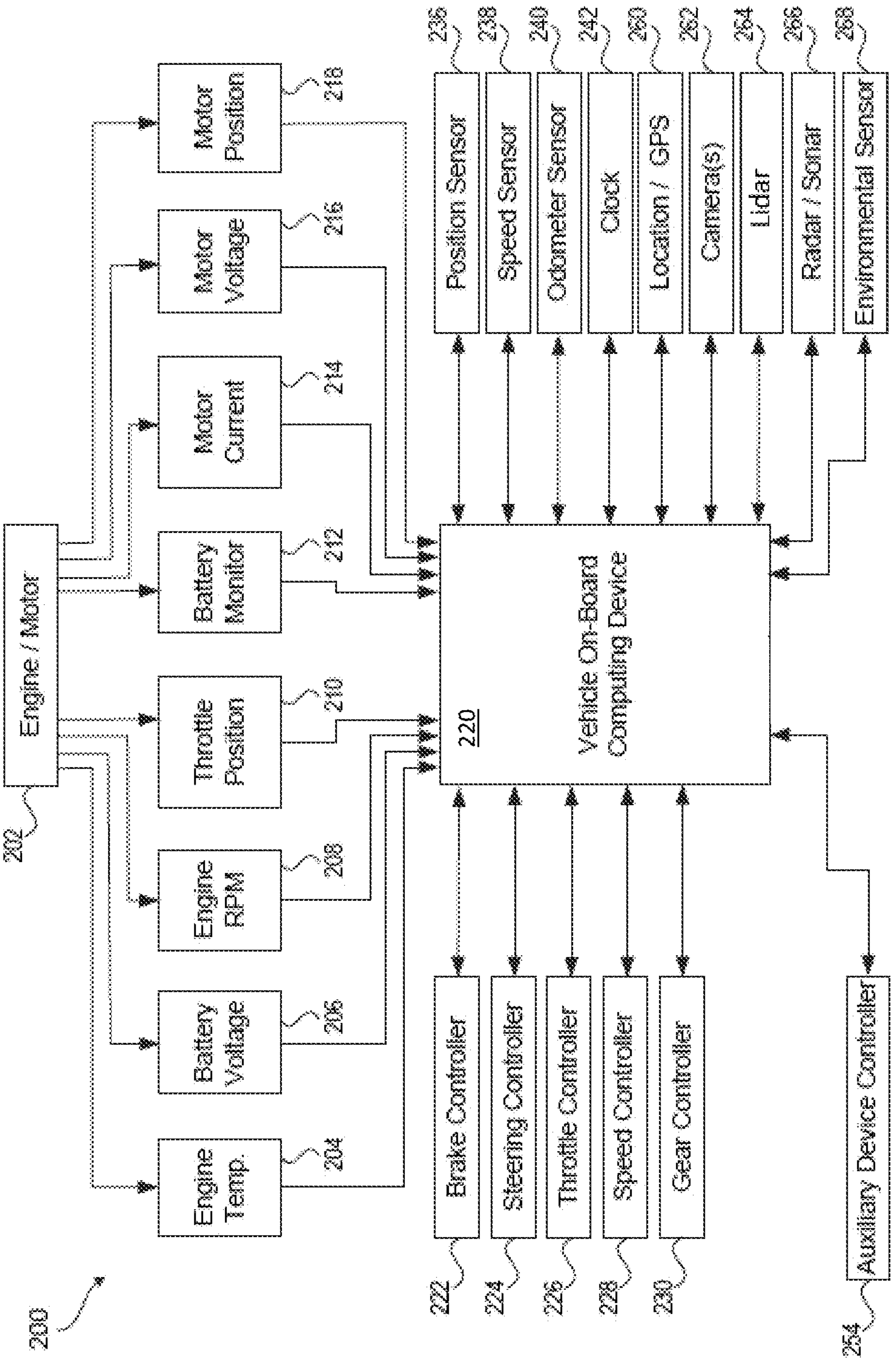
FIG. 2 illustrates an exemplary architecture for a vehicle, in accordance with aspects of the disclosure.

The sensor system 111 may include one or more sensors that are coupled to and/or are included within the AV 102*a*, as illustrated in FIG. 2. For example, such sensors may include, without limitation, a lidar system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102*a*, information about the environment itself, information about the motion of the AV 102*a*, information about a route of the vehicle, or the like. As AV 102*a* travels over a surface, at least some of the sensors may collect data pertaining to the surface.

As will be described in greater detail, AV 102*a* may be configured with a lidar system, e.g., lidar system 264 of FIG. 2. The lidar system may be configured to emit a light pulse 104 to detect objects located within a distance or range of distances of AV 102*a*. Light pulse 104 may be incident on one or more objects (e.g., AV 102*b*) and be reflected back to the lidar system. Reflected light pulse 106 incident on the lidar system may be processed to determine a distance of that object to AV 102*a*. The reflected light pulse may be detected using, in some aspects, a photodetector or array of photodetectors positioned and configured to receive the light reflected back into the lidar system. Lidar information, such as detected object data, is communicated from the lidar system to an on-board computing device, e.g., on-board computing device 220 of FIG. 2. The AV 102*a* may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102*a* over network 108, to/from server(s) and/or database(s) 112.

It should be noted that the lidar systems for collecting data pertaining to the surface may be included in systems other than the AV 102*a* such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102*a* may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102*a* and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102*a* including, for example, a keyboard, a touch screen display device, a microphone, and a speaker, etc.

FIG. 2 illustrates an exemplary system architecture 200 for a vehicle, in accordance with aspects of the disclosure. Vehicles 102*a* and/or 102*b* of FIG. 1 can have the same or similar system architecture as that shown in FIG. 2. Thus, the following discussion of system architecture 200 is sufficient for understanding vehicle(s) 102*a*, 102*b* of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The on-board computing device 220 may be implemented using the computer system of FIG. 14. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the aspects disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various aspects, the on-board computing device 220 may determine perception information of the surrounding environment of the AV 102*a*. Based on the sensor data provided by one or more sensors and location information that is obtained, the on-board computing device 220 may determine perception information of the surrounding environment of the AV 102*a*. The perception information may represent what an ordinary driver would perceive in the surrounding environment of a vehicle. The perception data may include information relating to one or more objects in the environment of the AV 102*a*. For example, the on-board computing device 220 may process sensor data (e.g., lidar or RADAR data, camera images, etc.) in order to identify objects and/or features in the environment of AV 102*a*. The objects may include traffic signals, road way boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some aspects, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102*a*, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to entering the intersection.

In various aspects, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102*a* that best navigates the autonomous vehicle relative to the objects at their future locations.

In some aspects, the on-board computing device 220 may receive predictions and make a decision regarding how to handle objects and/or actors in the environment of the AV 102*a*. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the AV 102*a* to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102*a*. If the risk exceeds an acceptable threshold, it may determine whether the collision can be avoided if the autonomous vehicle follows a defined vehicle trajectory and/or implements one or more dynamically generated emergency maneuvers in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the autonomous vehicle is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
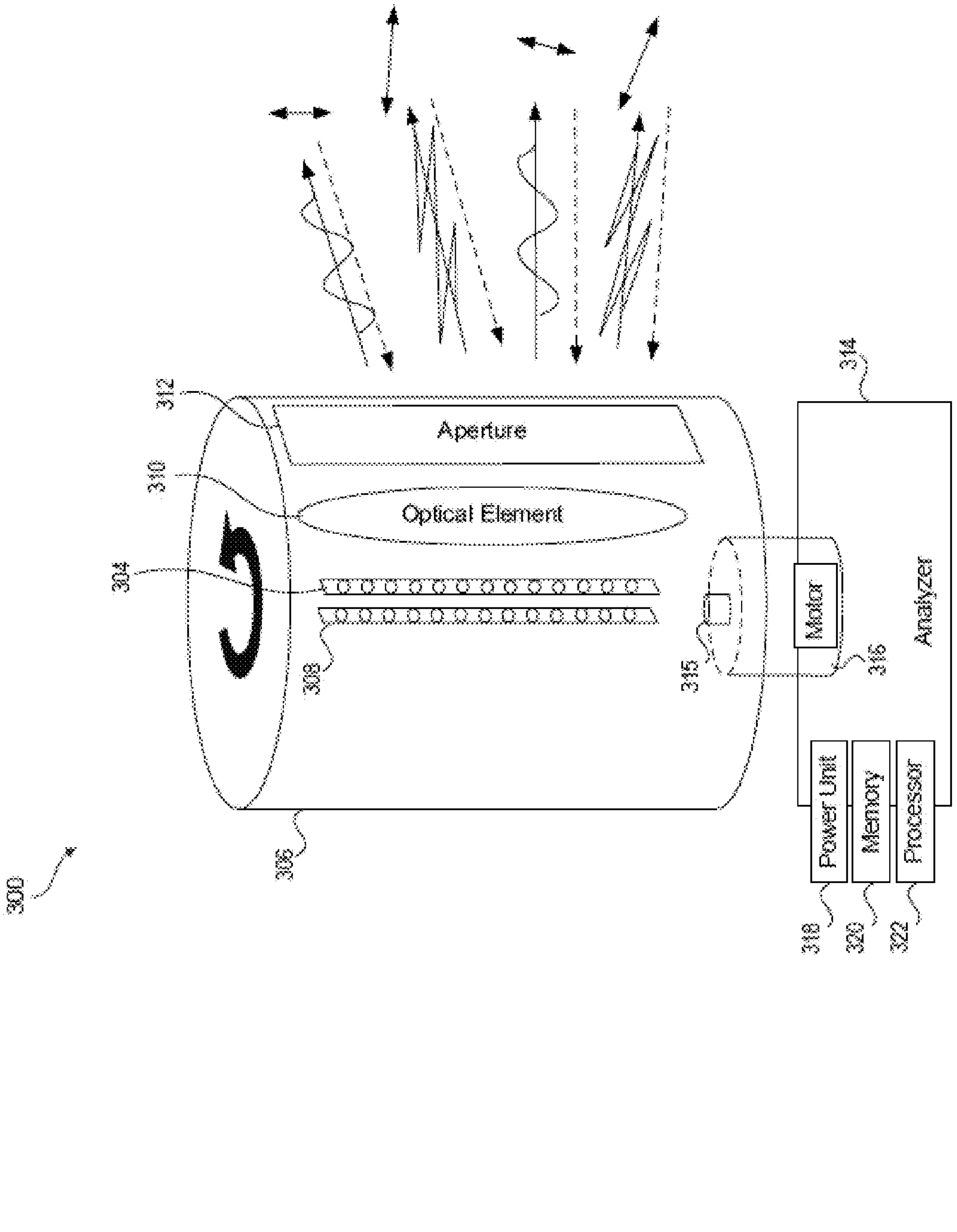
FIG. 3 illustrates an exemplary architecture for a lidar system, in accordance with aspects of the disclosure.

FIG. 3 illustrates an exemplary architecture for a lidar system 300, in accordance with aspects of the disclosure. Lidar system 264 of FIG. 2 may be the same as or substantially similar to the lidar system 300. As such, the discussion of lidar system 300 is sufficient for understanding lidar system 264 of FIG. 2. It should be noted that the lidar system 300 of FIG. 3 is merely an example lidar system and that other lidar systems are further completed in accordance with aspects of the present disclosure, as should be understood by those of ordinary skill in the art.

As shown in FIG. 3, the lidar system 300 includes a housing 306 which may be rotatable 360° about a central axis such as hub or axle 315 of motor 316. The housing may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the lidar system 300 can emit light through one or more of the aperture(s) 312 and receive reflected light back toward one or more of the aperture(s) 312 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The light emitter system 304 may include any number of individual emitters (e.g., 8 emitters, 64 emitters, or 128 emitters). The emitters may emit light of substantially the same intensity or of varying intensities. The lidar system also includes a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or waveplates that focus and direct light that is passed through the optical element structure 310.

One or more optical element structures 310 may be positioned in front of a mirror (not shown) to focus and direct light that is passed through the optical element structure 310. As shown below, the system includes an optical element structure 310 positioned in front of the mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

Lidar system 300 includes a power unit 318 to power the light emitting unit 304, a motor 316, and electronic components. Lidar system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the lidar system 300 as shown, or some or all of it may be external to the lidar system and communicatively connected to the lidar system via a wired or wireless communication network or link.

Figure 4B:
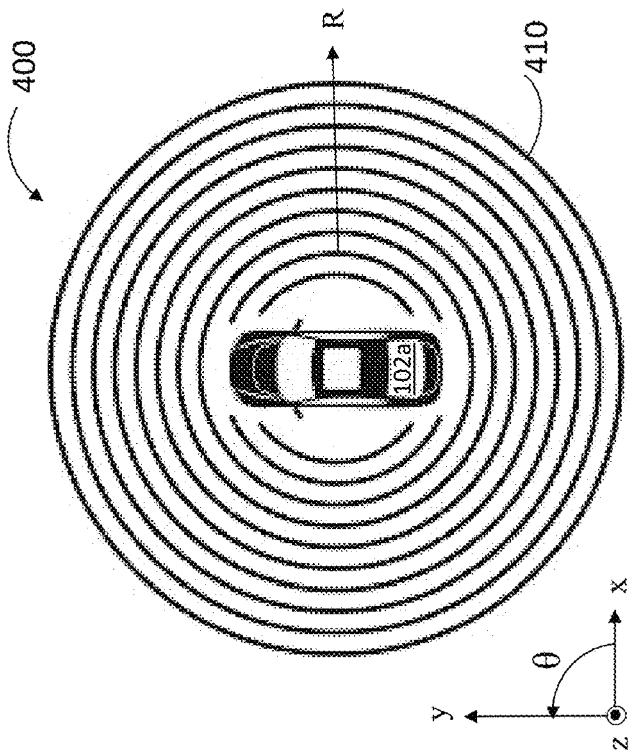
FIG. 4B is a top plan view of the autonomous vehicle shown in FIG. 1A, illustrating signals being emitted and received by the lidar apparatus, in accordance with aspects of the disclosure.
Figure 4A:
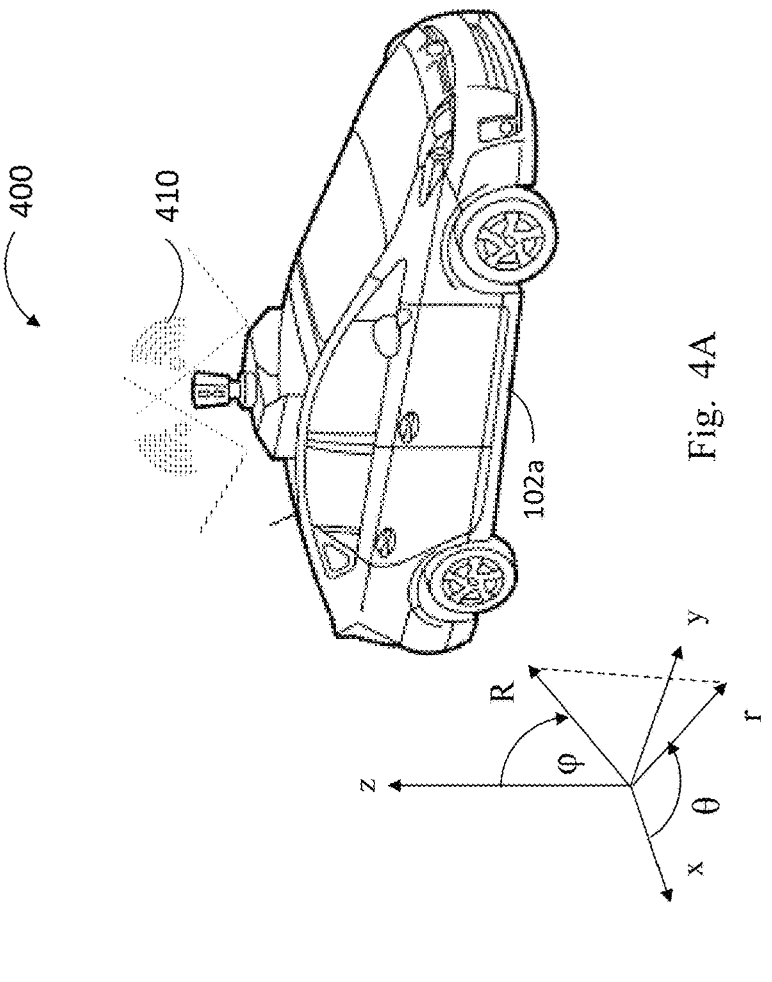
FIG. 4A is a pictorial view of an autonomous vehicle equipped with a lidar apparatus, in accordance with aspects of the disclosure.

FIGS. 4A and 4B illustrate a lidar apparatus 400, in accordance with aspects of the disclosure. In some aspects, lidar apparatus 400 is attached to an autonomous vehicle (AV) 102*a*, or driverless car. Lidar apparatus 400 can be attached to the roof of AV 102*a*, for a clear line of sight from which to emit and detect laser signals 110, e.g., pulsed laser beams. As AV 102*a* travels through its environment, lidar apparatus 400 can be used, alone, or in conjunction with other devices such as cameras, to determine radial distances (ranges) of various objects in the environment, relative to AV 102*a*. Objects of interest in the environment of AV 102*a* include, for example, buildings, trees, other vehicles, pedestrians, and traffic lights, which are generally located at, or slightly above, ground level.

Referring to FIG. 4B, a laser beam can be swept through selected ranges of azimuthal angle θ and elevation angle φ, so as to propagate laser signals 110 radially outward from the emitter of lidar apparatus 400, to reflect from objects in the vicinity of AV 102*a*. For a lidar apparatus 400 that is mounted to the roof of AV 102*a* as shown in FIG. 4B, the laser beam can be swept through all 360 degrees of azimuthal angle θ while being swept through only 45 degrees of elevation angle gyp, to best detect the relevant objects of interest that are located at lower elevations. The lidar sweep data can be stored and processed locally, e.g., in vehicle on-board computing device 220. Alternatively, lidar sweep data can be relayed to a remote computing system for immediate processing and/or storage for future reference. In addition to using lidar data to track traffic, obstacles, and roadways for autonomous driving functions, lidar data can also be used to orient AV 102*a* on a map for navigation using a GPS system.

The use of techniques disclosed herein within the example lidar apparatus 400 may serve to enhance the ability of lidar apparatus 400 to perform range determinations. It is noted that, although the lidar apparatus 400 is depicted in FIG. 4A as being incorporated into AV 102*a*, and having features as described herein, lidar apparatus 400 may also be implemented in other contexts. Furthermore, techniques described herein that are applied to lidar apparatus 400, e.g., temporal pulse coding and associated statistical analysis, may be used outside of the lidar context as well.

Figure 5:
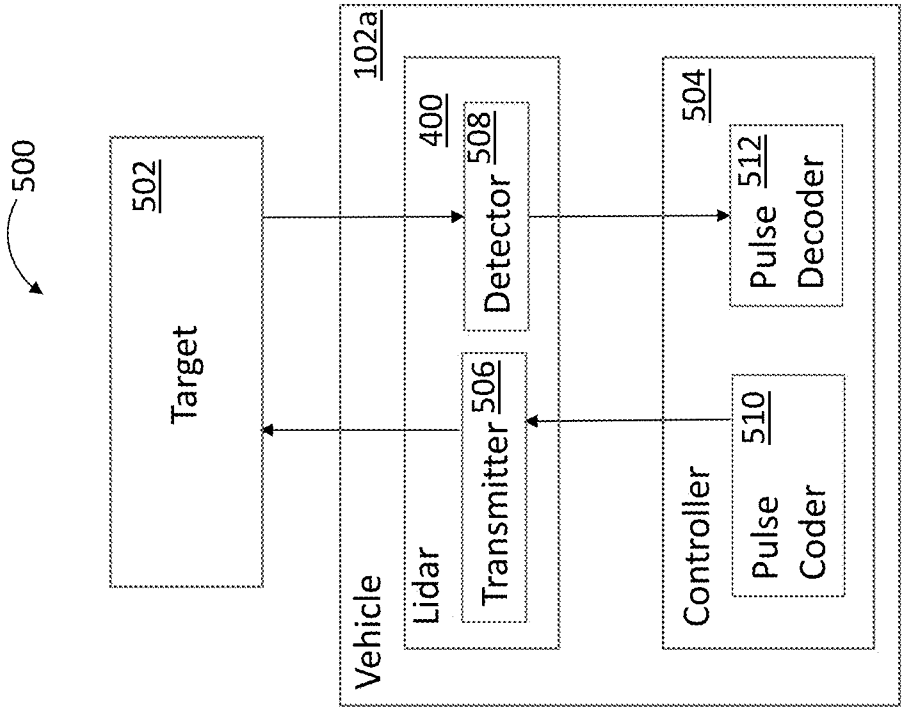
FIG. 5 is a block diagram of a system for operating a lidar apparatus, in accordance with aspects of the disclosure.

FIG. 5 shows a lidar system 500 for operating lidar apparatus 400 illustrated in FIGS. 4A and 4B, to determine a range of a target 502, in accordance with some aspects. Lidar system 500 includes lidar apparatus 400 and a controller 504 coupled to lidar apparatus 400. Lidar apparatus 400 includes an emitter 506 and a detector 508. In some aspects, emitter 506 is a pulsed laser source configured to emit laser beam pulses in a radial pattern as shown in FIG. 4B.

In some aspects, detector 508 is configured to detect laser pulse reflections from a target using a single-photon type of detector that indicates whether or not one or more photons has been received. Single-photon detectors are not sensitive to the number of photons in the reflected pulse; they simply act as digital optical switches that indicate whether one or more photons have been received. To build up analog contrast information from such a receiver, it is possible to use multiple pulses, or temporal averaging over multiple pulses. The dynamic range of the measurement will then scale with the number of pulses that are used. If only a small subset of the multiple pulses triggers a detection event, then the signal intensity returned from a target is low. If a large subset of the pulses triggers detection events, then the intensity is high.

In some aspects, controller 504 includes a pulse coder 510 and a pulse decoder 512 for providing signal processing functions. Controller 504 may be programmed to apply temporal pulse coding to emitted laser pulses via pulse coder 510, and to decode detected signals via pulse decoder 512, to distinguish between reflections from a close target and reflections from a distant target. Pulse coder 510 and pulse decoder 512 can be implemented in hardware (e.g., using application specific integrated circuits (ASICs) or software, or combinations thereof.

Lidar apparatus 400 and controller 504 are depicted as being within the contours of vehicle 102*a* and as separate entities, in accordance with aspects of the disclosure. However, one skilled in the relevant arts will appreciate that the particular placements of lidar apparatus 400 and controller 504 may include a variety of arrangements, including combination into a single unit, and the depiction is not limiting.

Figure 6A:
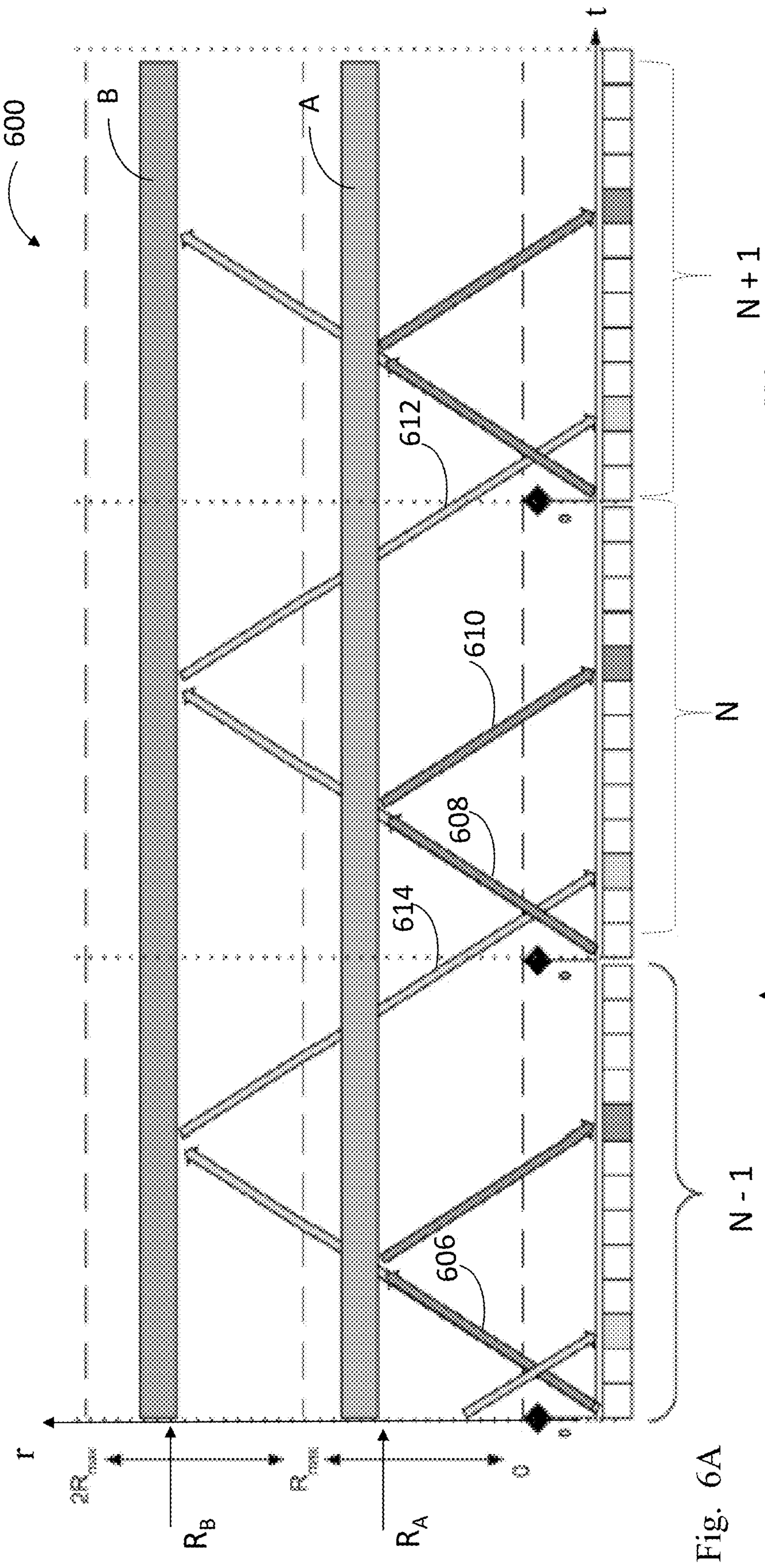
FIG. 6A is a lidar signal diagram illustrating an aliasing effect that gives rise to range ambiguity, in accordance with aspects of the disclosure.

FIG. 6A shows a timing diagram 600 for pulsed laser signals emitted and received by a lidar system that gives rise to aliasing. The operation of the lidar system includes the emission of several laser pulses (e.g., light pulse 606 or light pulse 608), each corresponding to a lidar frame. FIG. 6A shows a graph of distance r vs. time t. Distance r represents range corresponding to radial distances of targets from a detector. An exemplary in-range target A is located at a distance RA, less than $R_{max}$. An exemplary out-of-range target B is located at a distance $R_B$ between $R_{max}$ and $2R_{max}$. FIG. 6A shows three consecutive temporal lidar frames N−1, N, and N+1. In exemplary aspects shown in FIG. 6A for the purpose of illustration, each lidar frame includes 13 time bins, numbered 0 to 12, although one skilled in the art will appreciate that the number of time bins and corresponding time resolution can be selected based on a desired resolution. However, alternative example aspects may have 1000 or more time bins, and aspects may also have a 0.5 ns or smaller time resolution. Pulses are emitted by lidar apparatus 400 at regular time intervals (three shown) at the beginning of each lidar frame (indicated by black diamonds in FIG. 6A and depicted for illustrative purposes as occurring at the very beginning of the frame, i.e., with no dither—as discussed later). For example, at time bin 0, at the beginning of lidar frame N, a light pulse 608 is emitted and reflects from target A. Reflected light pulse 610 is detected within the same lidar frame N, at time bin 8.

If an out-of-range target B reflects a pulse (instead of an in-range target such as target A reflecting the pulse) such as with emitted light pulse 608, reflected light pulse 612 is detected in a subsequent lidar frame, in this case frame N+1 at time bin 2. Similarly, in this case, a reflected light pulse 614 from out-of-range target B, associated with a transmission at time bin 0 of a previous lidar frame, N−1, is detected within lidar frame N at time bin 2. Targets even further out-of-range may be detected several lidar frames later.

Figure 6B:
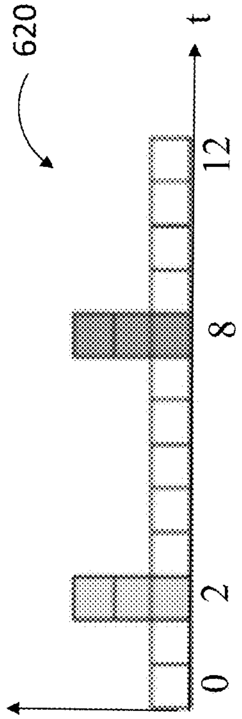
FIG. 6B is an avalanche histogram corresponding to the signal diagram shown in FIG. 6A, in accordance with aspects of the disclosure.

FIG. 6B shows an avalanche histogram 620 plotting the number of time measurements received within the duration of a data frame for the example shown in FIG. 6A. The aggregation of measurements from multiple lidar frames within a data frame duration yields a histogram from which points of a point cloud can be extracted. Avalanche histogram 620 shows that, in each lidar frame, the in-range measurements RA are all received at time bin 8 and the out-of-range measurements $R_B$ are all received at time bin 2. Thus, for avalanche histogram 620, targets are detected at both RA and $R_B$, when in actuality RA is the only in-range target. The minimum number of lidar frames needed in a data frame is governed, in accordance with an aspect, by the number of ranges from which a pulse can be reflected and received. For example, if a pulse emitted at frame N−1 is received at frame N+1, all three of the intervening frames would need to be considered in order for the reflecting object to be detectable.

Since avalanche histogram 620 cannot disambiguate between the out-of-range target $R_B$ and an in-range target that would give rise to equivalent histogram detections at the same time bin, i.e., time bin 2, the detected reflections end up creating ambiguity over where the actual in-range target is located, as both sets of reflections aggregate to the same measure within the histogram. FIG. 6B thus illustrates range ambiguity caused by the aliasing effect depicted in FIG. 6A. It is noted that even if a signal received from out-of-range target $R_B$ is weaker than a signal received from in-range target RA, as long as the signal received from out-of-range target $R_B$ meets a probability-of-detection criterion, it can give rise to range ambiguity.

Figure 7:
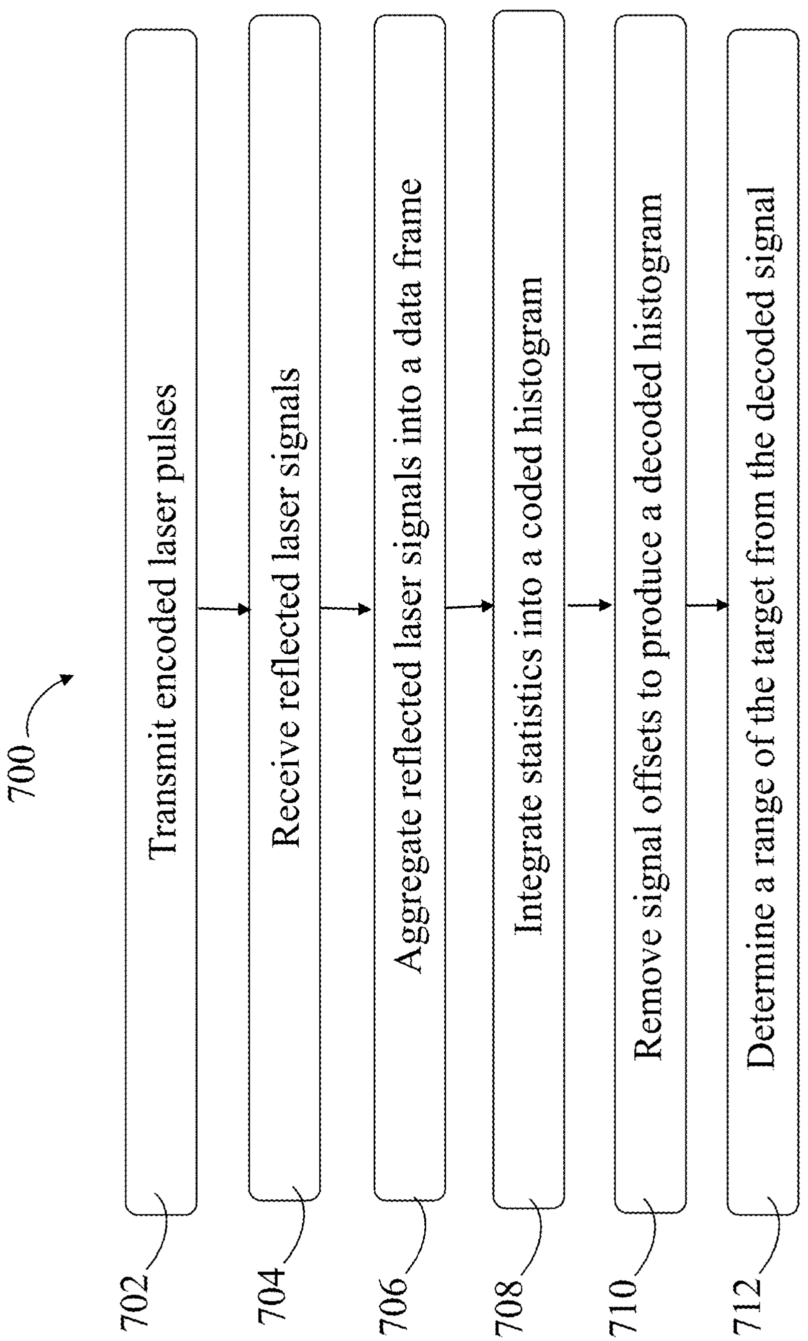
FIG. 7 is a flow diagram of a method for eliminating aliasing effects from lidar time-of-flight range measurements, in accordance with aspects of the disclosure.
Figure 8A:
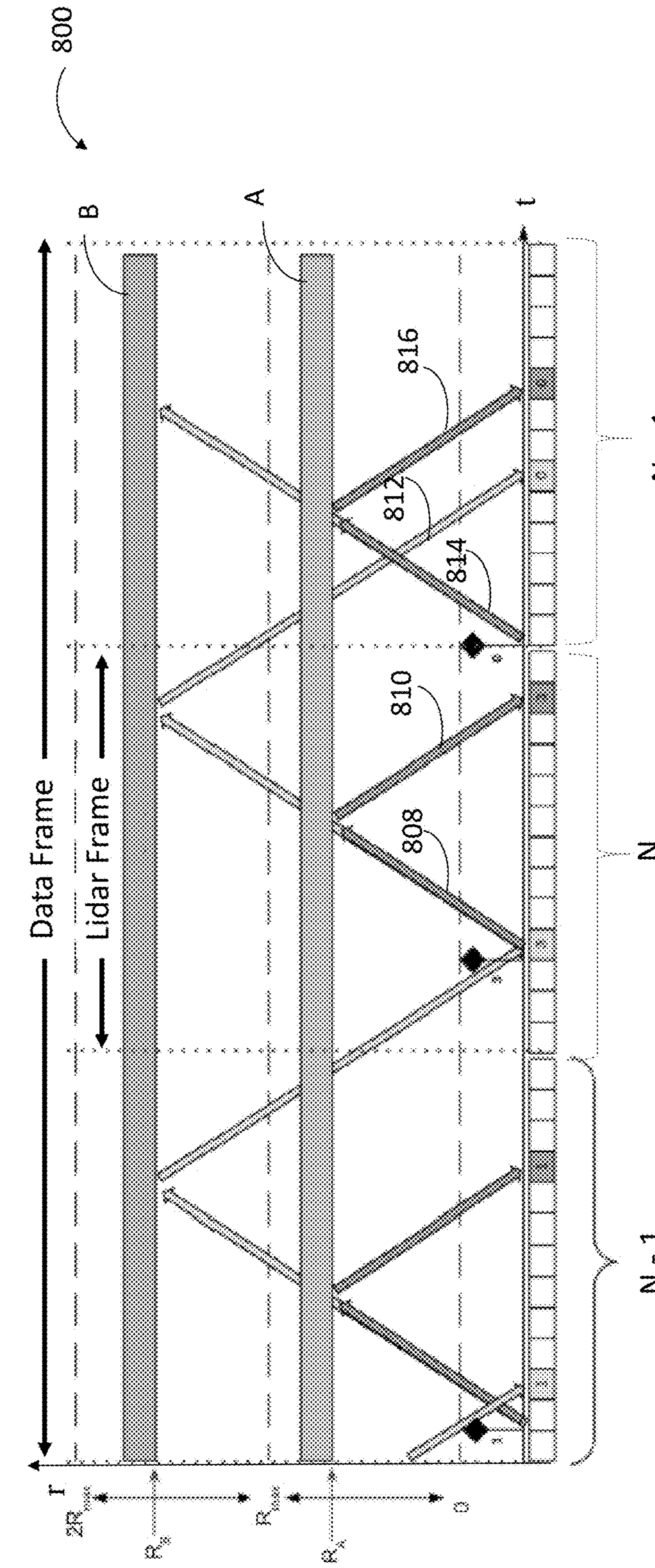
FIG. 8A is a lidar signal diagram illustrating mitigation of the aliasing effect shown in FIGS. 6A-6B, using pulse coding, in accordance with aspects of the disclosure.

In order to resolve the range ambiguity effect, it is possible to use a pulse coding technique to identify which reflections are coming from in-range targets and which are coming from out-of-range targets (and even a specific range for the out-of-range targets). FIG. 7 is a flow diagram showing steps in a method 700 of pulse coding to eliminate aliasing in lidar range measurements made with lidar apparatus 400, according to some aspects. Referring to FIG. 7, at operation 702, a set of encoded laser pulses are emitted and propagate toward a target A, as shown in FIG. 8 with respect to an exemplary timing diagram 800. FIG. 8A shows timing diagram 800 for pulsed laser signals emitted and received by lidar system 500, operating with temporal pulse coding designed to eliminate aliasing, according to some aspects. FIG. 8A shows a graph of distance r vs. time t, similar to the graph shown in FIG. 6A. Again, in FIG. 8A, a set of pulses, indicated by black diamonds, is emitted by lidar apparatus 400 in consecutive lidar frames N−1, N, and N+1. Instead of the pulse emissions occurring in time bin 0 of each lidar frame, in FIG. 8A, pulse emissions occur at irregular time intervals (three shown), that is, with different offset times, or timing offsets. The timing offsets serve as labels, or codes, identifying when the pulse was emitted. The sequence of time offsets thus provides a temporal encoding that, when appropriately decoded, disambiguates the received pulses in order to select for measurements that correspond to targets within in-range distances.

As shown in FIG. 8A, in lidar frame N−1, a pulse is emitted with a time offset, at time bin 1; in lidar frame N, a pulse is emitted with a different time offset, at time bin 3; and in lidar frame N+1, a pulse is emitted with no time offset, at time bin 0. Hence, the pulse code applied to these laser pulse emissions is [1, 3, 0]. While the emission of these pulses coincides with a time bin for purposes of coding, the time offset in the analog sense is referred to as dither, and is discussed in further detail below.

Referring to FIG. 7, at operation 704, lidar apparatus 400 receives reflected laser signals from targets A and B, as shown in FIG. 8A with respect to exemplary timing diagram 800, according to some aspects. For example, in lidar frame N, a light pulse 808 is emitted from lidar apparatus 400 with coding by pulse coder 510 such that the emission coincides with time bin 3. Emitted light pulse 808 is shown as reflecting from in-range target A as reflected light pulse 810. Reflected light pulse 810 is detected within the same lidar frame N, at time bin 11. Similarly, if emitted light pulse 808 reflects from out-of-range target B, reflected light pulse 812 is detected in the next lidar frame, N+1 at time bin 5. Meanwhile, in lidar frame N+1, emitted light pulse 814 is emitted at time bin 0, and is shown as reflecting from in-range target A as reflected light pulse 816. Reflected light pulse 816 is detected in the same lidar frame N+1 at time bin 8.

In short, in the scenario presented in FIG. 8A, for lidar frame N−1, the pulse signal is offset by one bin; for lidar frame N, the pulse is offset by three bins; and for lidar frame N+1 the pulse offset is zero, i.e., no offset is applied. At step 706 of FIG. 7, the reflected pulse signals are aggregated into a data frame. Assuming a data frame selected to integrate those three lidar frames, the effective pulse code applied in this data frame is [1, 3, 0], by way of non-limiting example.

The pulse code implemented through the use of different offsets can then be unwound (decoded) before building an avalanche histogram. The numbers shown in the bins corresponding to each received reflected pulse (e.g., 810 and 816) indicate the pulse offset that was applied to the single pulse that was emitted at that particular lidar frame. The bins are tagged with these offset values. Since the number shown in each bin matches the offset of the signal emitted within that same frame, reversing the offset on each detected reflection within that lidar frame across all lidar frames within a data frame, will have the cumulative effect of aggregating the received reflected pulses that are from in-range objects. The received reflected pulses from out-of-range objects would be inconsistently bin-shifted across lidar frames, such that their cumulative effect within an avalanche histogram across a data frame will be negligible (identifiable as noise).

Figure 8B:
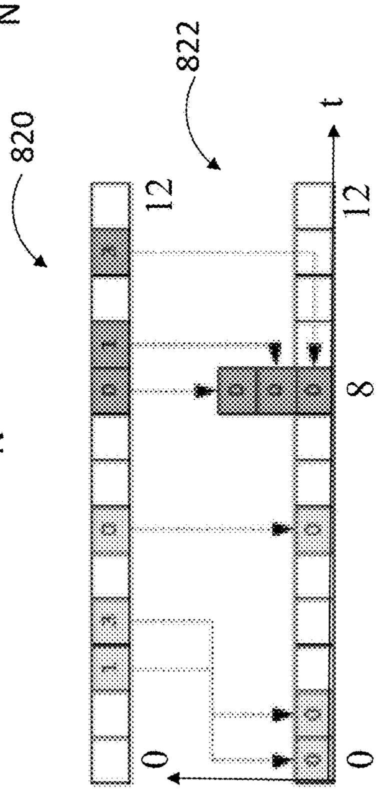
FIG. 8B is an avalanche histogram showing the effect of pulse coding in accordance with aspects of the disclosure.

In FIG. 8B, there are two histograms that result from the integration of the three lidar frames depicted in FIG. 8A, by way of non-limiting example. The top histogram 820 is a coded histogram that includes the detection events with the embedded pulse offsets. The bottom histogram 822 depicts the detection event histogram after decoding by removing the pulse offsets. At step 708 of FIG. 7, the pulses received for the given data frame are integrated into a coded histogram, such as coded histogram 820. And at step 710, the offsets are removed to produce a decoded histogram, such as decoded histogram 822. Following the decoding operation, it can be seen in the bottom histogram 822 how the detections from reflections of an in-range object all coincide within a single histogram time bin, while the out-of-range object detection events are instead spread out in the histogram and do not coincide. As a result, the pulse coding operation depicted in this example suppresses the detection of out-of-range objects beyond a distance $R_{max}$, as the spread out detection events can then be dismissed as noise.

Finally, at step 712, with a decoded histogram built to aggregate the in-range received pulses, the position of the coinciding events within that decoded histogram can be used to determine a distance to the in-range target.

Figure 9:
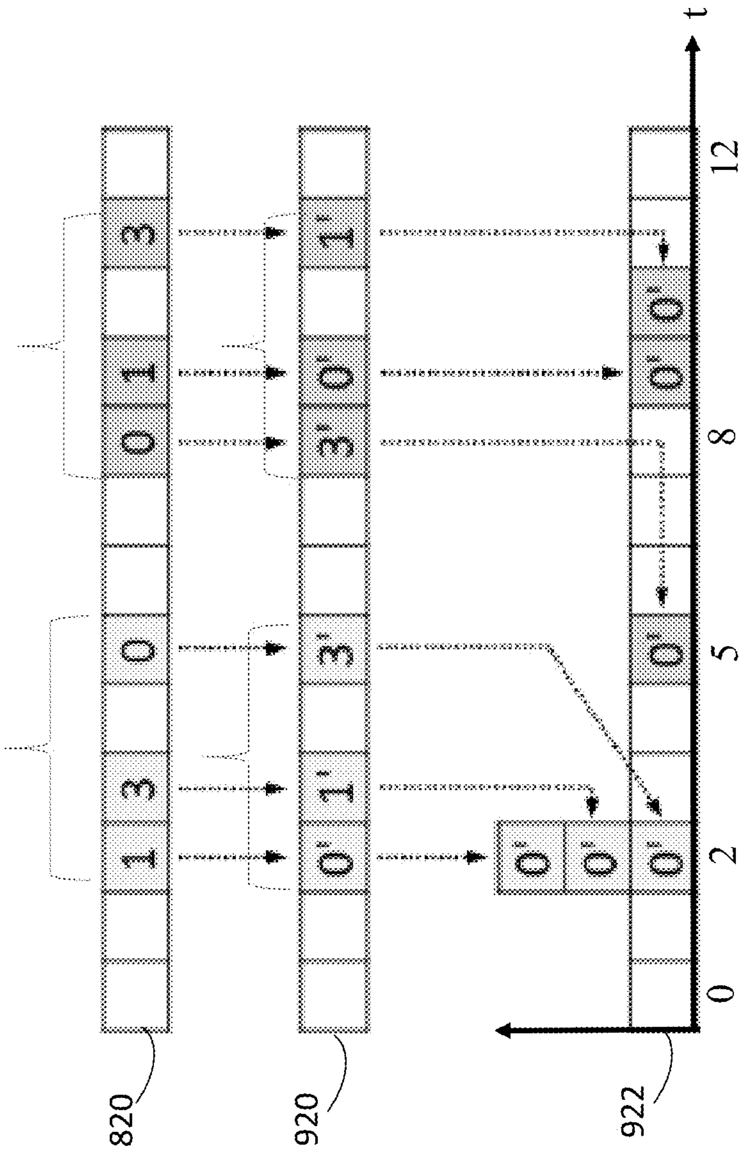
FIG. 9 is an avalanche histogram illustrating cycling re-mapping of pulse coding and decoding for first-order out-of-range detections, in accordance with aspects of the disclosure.

FIG. 9 shows an alternative coding scheme 900 that can be applied by pulse decoder 512, according to some aspects. Unlike the histograms of FIGS. 8A and 8B that show the decoding process for an in-range target, backing out the offsets within a single frame, FIG. 9 shows how to use histogram 820 to detect out of range targets, in this case in the range $R_{max}$ to $2R_{max}$. Alternative coding scheme 900 includes deriving, from an original temporal pulse code, a cyclic pulse code, and using the cyclic pulse code to generate cyclic decoded avalanche histogram 922, for out-of-range detections for $R_{max} \leq R_B < 2R_{max}$. This can be done by using the next cyclic variation of the original pulse code [1, 3, 0], by mapping [1→0', 3→1', 0→3'] to obtain cyclic code [0', 1', 3']. Using the cyclic code, original avalanche histogram 820 is converted to avalanche histogram 920. Decoding proceeds using the labeled offsets on the leftmost time bins in avalanche histogram 920 to perform subtractions for $R_B$ and labeled offsets on the rightmost time bins in avalanche histogram 920 to perform subtractions for RA. First-order aliased reflections from $R_B$ are coincident at time bin 2 and can be extracted, while spreading out apparent detection times for closer multiple reflections from RA within the maximum range $R_{max}$.

Effectively, use of alternate coding scheme 900 doubles the range over which target distances can be measured, from $R_{max}$ to $2R_{max}$ without an increase in total measurement time as it is able to compute targets within this further range from the same data frame. By emitting multiple pulses, one per lidar frame, with an offset particular to that lidar frame, it is possible to distinguishing reflections within multiple ranges. One decoding sequence [1,3,0] provides measurements at close range, in a first zone, up to $R_{max}$, and a second cyclic decoding sequence [0,1,3]—cyclically related to the first decoding sequence—provides measurements at a longer range, in a second zone, between $R_{max}$ and $2R_{max}$.

One skilled in the relevant arts will appreciate that this approach can be extended to provide detection of targets in additional zones. For example, a third cyclic decoding sequence [3,0,1] can be used to decode reflections from targets in a third zone, at a range between $2R_{max}$ and $3R_{max}$. In general, for N pulses within a data frame and with appropriate selection of the corresponding offsets within a lidar frame, it is possible to disambiguate ranges as far as $N*R_{max}$.

In some aspects, a decoding sequence is chosen so as to keep the same maximum range and to double, or increase, the pulse rate to define multiple detection zones. Depending on the temporal pulse code that is used, one zone will become a detection zone while other zones will be treated as being out of range, or interfering zones. An advantage of this approach is that it offers a way to double the number of pulse statistics used in resolving targets because more pulses emitted per unit time results in a greater number of detections.

Figure 10A:
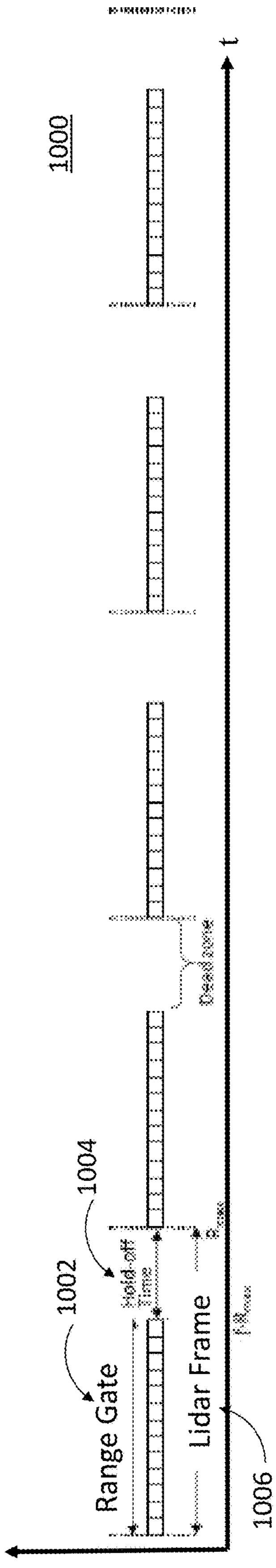
FIG. 10A is a timing diagram illustrating dead zones in the absence of arm coding, in accordance with aspects of the disclosure.
Figure 10B:
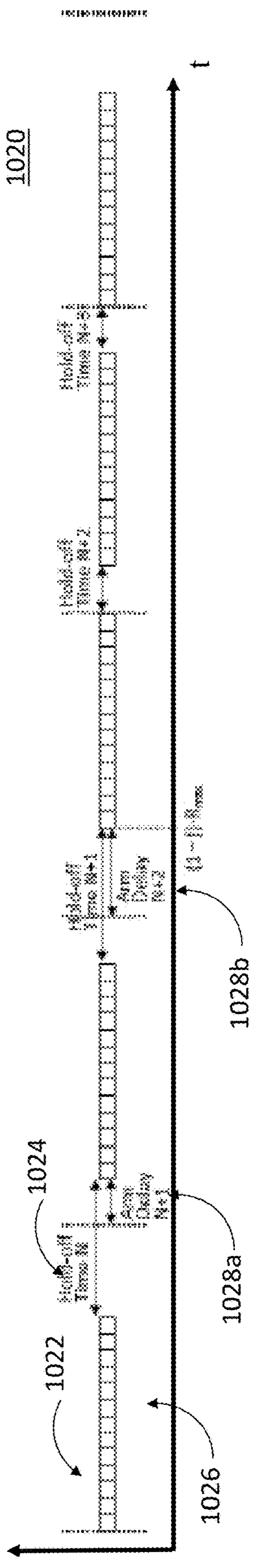
FIG. 10B is a timing diagram illustrating how arm coding can be used to eliminate dead zones, in accordance with aspects of the disclosure.

FIGS. 10A-10B show further details of timing signals within a frame. FIG. 10A shows a series of frames 1000 for which the hold-off time 1004, or "dead zone," is the same in every frame, such as lidar frame 1006. FIG. 10B shows a series of frames 1020 to which an arm coding procedure, explained below, has been applied so that the dead zone in each frame is different.

Figure 12:
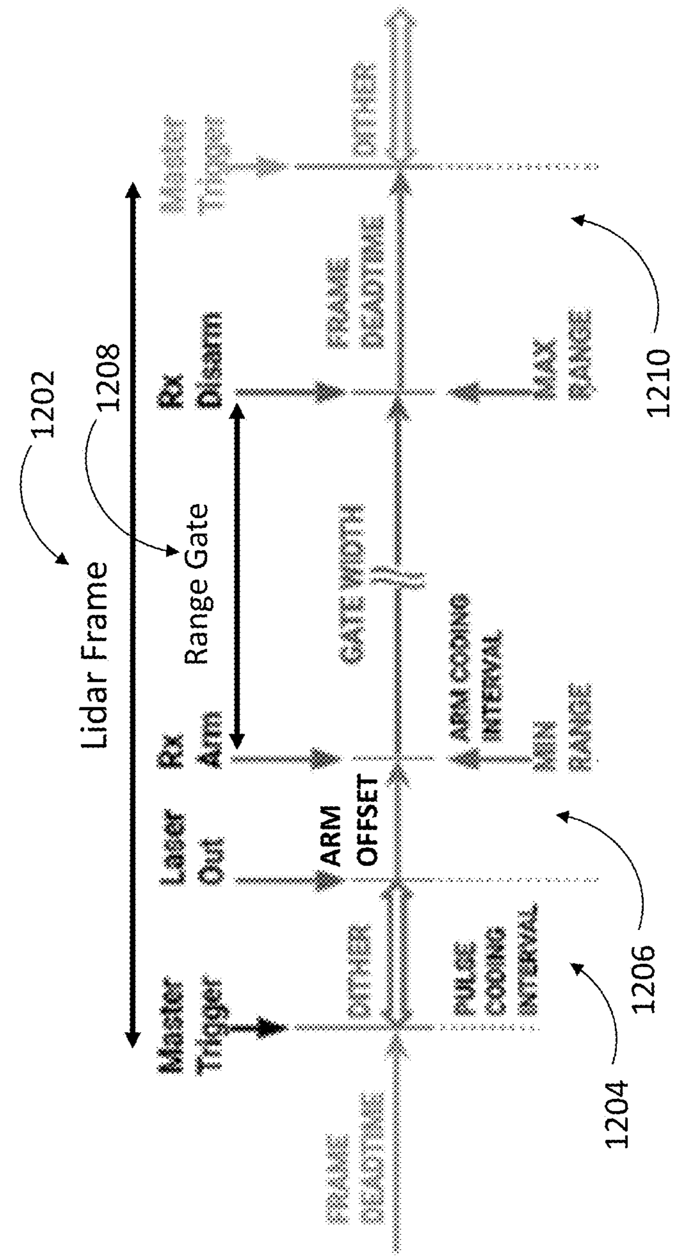
FIG. 12 is a timing diagram for a lidar frame used in a lidar pulse coding simulation, in accordance with aspects of the disclosure.

After each range gate having 13 time bins, as described above, there is a hold-off time, during which the detector is unarmed and not available for detecting reflected pulses. In this context, a lidar frame encompasses the 13-time bin range gate plus the hold-off time. In some aspects, the hold-off time may include a combination of a frame dead-time, any dither, and/or any arm offset, as shown in FIG. 12. For many single-photon detectors, a hold-off time is imposed by inherent reset times (e.g., related to RC time constants). Alternatively, a hold-off time can be intentionally introduced to avoid the occurrence of false detections immediately following a preceding detection.

To detect objects over a continuous range from 0 to $2R_{max}$, pulse coding can be combined with arm coding as discussed above. While pulse coding varies the laser emission time between frames, arm coding varies the timing of the detector arming and disarming from one frame to the next using appropriate "arm offsets." In particular, the hold-off time can be shifted relative to the duration of the lidar frame so that the detector is not disarmed for the same range interval in every lidar frame. This can be done by varying the period within each frame during which the detector is armed.

The use of a fixed hold-off time constrains the detector to measuring only pulses reflected from distances between 0 and $f \cdot R_{max}$, where f is a fraction in unit interval $0<f<1$. By arming the detector at the beginning of the range gate and disarming it at a time corresponding to a reflection from a distance $f \cdot R_{max}$, as shown in the first series of frames 1000, any reflections from distances in the range of $f \cdot R_{max}$ to $R_{max}$ will reach the detector during the hold-off time 1004, resulting in a "dead zone" in which objects are not seen. However, through the use of arm coding, the range intervals for which the detector is armed can be varied from $[0, f \cdot R_{max}]$ to $[(1-f)*R_{max}, R_{max}]$, thereby enabling detections from all ranges between 0 and $R_{max}$.

With arm coding, hold-off times can vary, but as long as the minimum hold-off time is sufficient, the detector will maintain good performance. A minimum hold-off time 1024 is maintained between the disarming of the detector during lidar frame N−1 at 1026 and the arming of the detector at lidar frame N. In some aspects, a length of the range gate may be a fixed value with the hold-off time being a variable value that is equal to or longer than the minimum hold-off time 1024. For example, for a lidar frame length of 80 m, the length of the range gate may be fixed at 72 m and with the hold-off time may be between 4 m and 12 m, with 4 m being the minimum hold-off time 1024. In some aspects, the length of the range gate may be a variable value with the hold-off time being a fixed value set at the minimum hold-off time 1024. For example, for a lidar frame length of 80 m, the length of the range gate may vary between 74 m and 76 m and with the hold-off time being constant at 4 m. In some aspects, the length of the range gate and the hold-off time may both be variable. For example, for a lidar frame length of 80 m, the length of the range gate may vary between 74 m and 76 m and with the hold-off time being between 4 m and 6 m, with 4 m being the minimum hold-off time 1024. It should be understood by those of ordinary skill in the art that these are examples of the length of the range gate and minimum hold-off time and that other values are further contemplated in accordance with aspects of the present disclosure. By applying the arm coding technique described herein and introducing arm offsets 1028*a* and 1028*b*, the start and end of the range gate, such as range gate 1022 and subsequent range gates in series of frames 1020, can be shifted to eliminate any blind zones. Thus, by combining arm coding with pulse coding of the laser emissions, lidar apparatus 400 can measure objects over a continuous range from 0 to $2R_{max}$.

FIG. 11 shows exemplary non-limiting pulse code sequences of various lengths N, according to some aspects. N is a number of pulses accumulated for statistical analysis to extract a single point in a lidar point cloud, corresponding to a single target in a scene. Each number in the pulse code sequences shown in FIG. 11 is a time offset applied during a separate frame. For example, N=13 shows 13 time offsets applied over 13 consecutive frames, and then repeated every 13 lidar frames.

Each pulse code sequence shown in FIG. 11 starts with a time offset, applied during a first lidar frame, increases to a maximum offset in approximately the middle of the sequence, and repeats in reverse. For example, the first pulse code sequence for which N=12 begins with a time offset of 1 during the first lidar frame, increases to a time offset of 22 at lidar frame 7, and decreases back to a time offset of 7 at lidar frame 12. The second pulse code sequence for N=13 begins with a time offset of 1 for the first lidar frame, increases to a time offset of 29 at lidar frame 8, and decreases back to a time offset of 8 at lidar frame 13.

In some aspects, pulse codes can be chosen such that the difference between successive offsets, d, in a sequence, d(n)-d(n−1), is a different value for each n. Pulse codes can be selected in this manner to ensure that the pulse code results in a diffuse, or spread-out, decoded histogram for out-of-range targets, with a commensurate improvement in noise reduction associated with faraway objects. In the example shown in the first row of FIG. 11 for which N=12, successive values of the difference d(n)-d(n−1) are: 6, 5, 4, 3, 2, 1, −1, −2, −3, −4, and −5.

However, as would be understood by those skilled in the relevant arts from the coding and decoding histogram processes described above, any coding approach that results in the ability to distinguish in-range and out-of-range targets can be used, and these approaches are provided by way of non-limiting example.

FIG. 12 is a timing diagram 1200 for a lidar frame 1202 used in a lidar pulse coding simulation, in accordance with aspects of the disclosure. The lidar frames described in FIGS. 6A, 8A, 10A, and 10B show the various time offsets, such as pulse coding/dither offsets, gate delays, frame deadtime, etc. on a scale commensurate with lidar frame bins. However, these timings can be illustrated separate from the lidar frame bins as in timing diagram 1200.

Each lidar frame begins with a recurring master trigger that is timed to account for the maximal length of the lidar frame 1202, in accordance with aspects of the disclosure. When the master trigger occurs, a pulse coding interval (dither) 1204 is applied in the event that pulse coding is used to aid in differentiating in-range targets from out-of-range targets, as discussed with respect to FIGS. 8A and 8B. Alternatively, no dither may be applied, and this interval can be disregarded.

Subsequent to any dither, a light pulse is emitted. The total travel time from which this light pulse is emitted, reflected from a target, and detected must occur within the range gate 1208 for an in-range target. If the pulse is instead detected in a subsequent range gate, based on a reflection from an out-of-range target, then it is possible to use the pulse coding interval of the emitted light pulse to disambiguate the reflected signal, as discussed above with respect to FIGS. 8A and 8B.

However, after the light pulse is emitted, an additional delay is present before the detector is armed (and the range gate begins). This delay is termed arm offset 1206. In certain aspects of the disclosure, arm offset 1206 can be controlled, with respect to deadtime 1210 that occurs after the detector is disarmed, in the manner discussed above with respect to FIGS. 10A and 10B to improve system performance.

Figure 13:
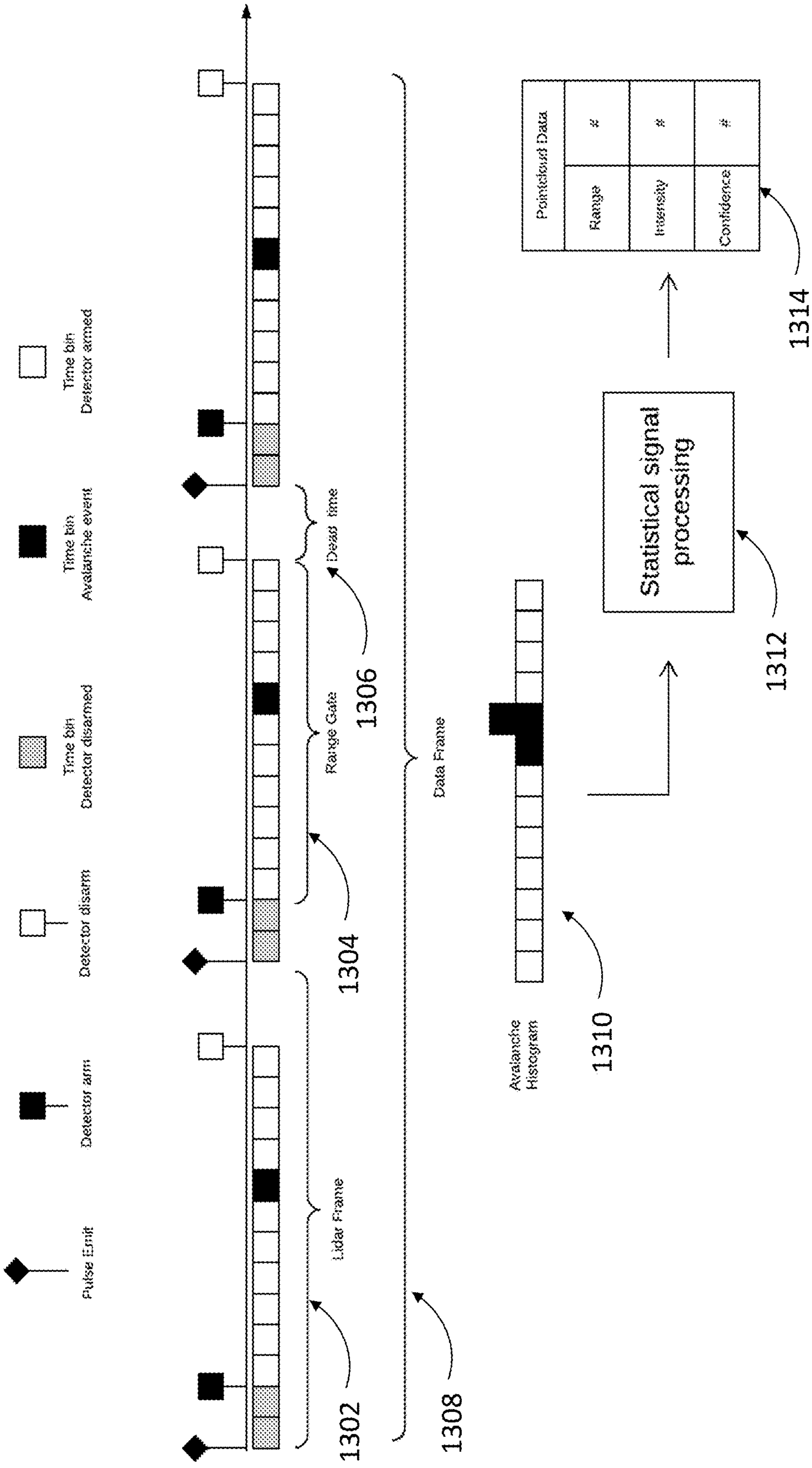
FIG. 13 illustrates a structural view of a data frame and its use in constructing an avalanche histogram, in accordance with aspects of the disclosure.

FIG. 13 illustrates a structural view 1300 of a data frame and its use in constructing an avalanche histogram, in accordance with aspects of the disclosure. A lidar frame 1302 is shown as having a pulse emitted right at the beginning (time t=0) of the lidar frame, so in the examples shown no dither corresponding to a coding offset is applied. If such an offset were applied, the pulse emit indicator would be shifted over to a bin number commensurate with the code, in accordance with aspects of the disclosure, as discussed with respect to FIGS. 8A and 8B, but such offsets are disregarded here.

For some time later, here a two bin time span, the detector is in a disarmed state corresponding to the arm offset. At the end of this period, the detector is armed. From then, until the point that the detector is disarmed, is the gate width corresponding to the time span during which a reflected pulse can be detected (within the range gate 1304). As shown in the example of structural view 1300, a time bin avalanche event occurs at time bin 9 at the first shown lidar frame, again at time bin 9 in the second shown lidar frame, and at time bin 8 for the third shown lidar frame. Lidar frame 1302 also includes a period between when the detector is disarmed and the next pulse is emitted corresponding to dead time 1306.

In the aggregate, these three lidar frames (by way of non-limiting example—more lidar frames can be used) are considered part of a data frame 1308. In the case where there are N lidar frames within a given data frame 1308, a data frame such as data frame 1308 can be constituted out of non-overlapping sets of N lidar frames (a first set of N lidar frames, the next set of N lidar frames, and so on). Alternatively, data frame 1308 can be a rolling window of lidar frames, such that a first data frame such as data frame 1308 encompasses lidar frames 0 to N, and the subsequent data frame encompasses lidar frames 1 to N+1, and so on. This can be done because, while a lidar emitter goes through a 360 degree sweep periodically, each lidar frame within a data frame can be treated as essentially being taken at a fixed position of the emitter and the sweep motion can be disregarded.

Avalanche histogram 1310 can then be constructed from all of the avalanche events across lidar frames within data frame 1308, in accordance with an aspect. And, as detailed in FIGS. 8A and 8B, this avalanche histogram 1310 could be decoded if a coding (not shown here) has been applied. The resulting avalanche histogram 1310 can then be processed through a statistical processing block 1312 used to generate point cloud data 1314 from which targets can be identified.

Figure 14:
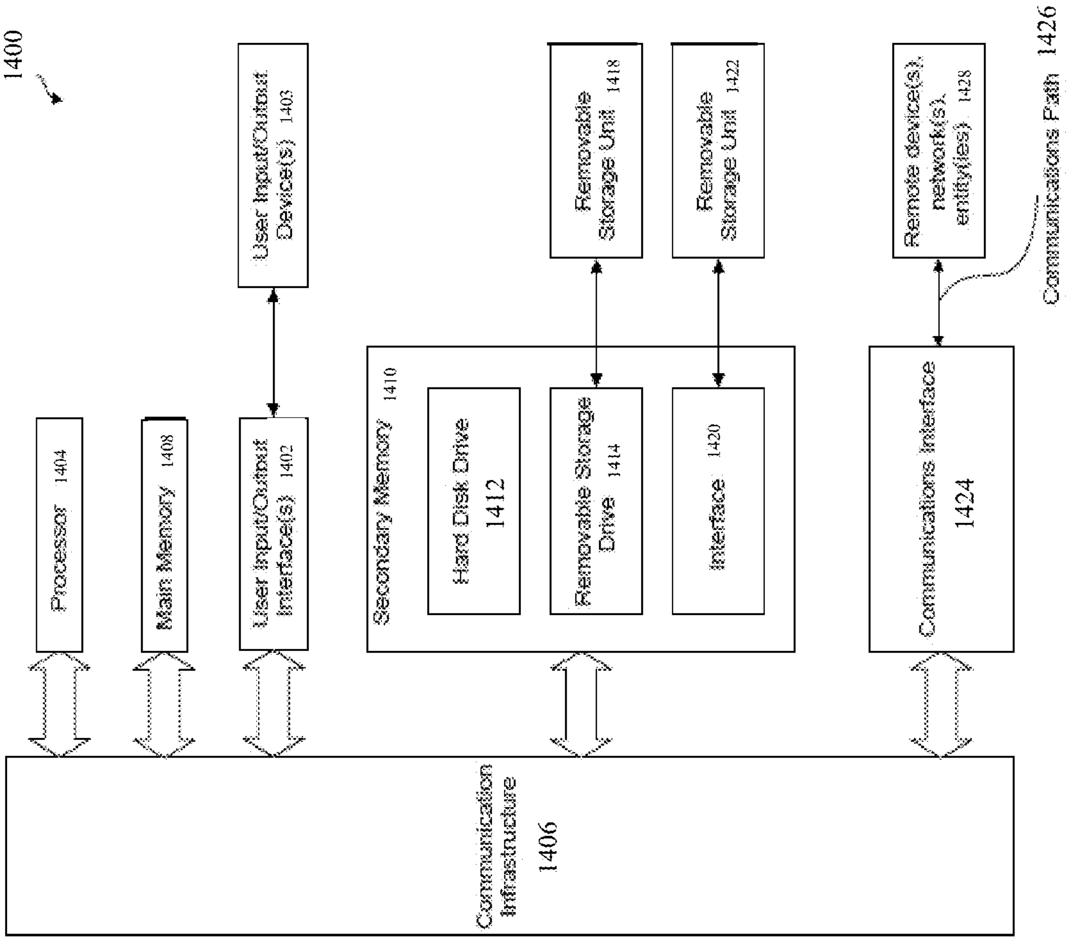
FIG. 14 is a block diagram of an example computer system useful for implementing various aspects of the disclosure.

Various aspects can be implemented, for example, using one or more computer systems, such as computer system 1400 shown in FIG. 14. Computer system 1400 can be any computer capable of performing the functions described herein.

Computer system 1400 can be any well-known computer capable of performing the functions described herein.

Computer system 1400 includes one or more processors (also called central processing units, or CPUs), such as a processor 1404. Processor 1404 is connected to a communication infrastructure or bus 1406.

One or more processors 1404 may each be a graphics processing unit (GPU). In an aspect, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1400 also includes user input/output device(s) 1403, such as monitors, keyboards, pointing devices, etc., that communicate with communication infrastructure 1406 through user input/output interface(s) 1402.

Computer system 1400 also includes a main or primary memory 1408, such as random access memory (RAM). Main memory 1408 may include one or more levels of cache. Main memory 1408 has stored therein control logic (i.e., computer software) and/or data.

Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, tape backup device, and/or any other storage device/drive.

Removable storage drive 1414 may interact with a removable storage unit 1418. Removable storage unit 1418 includes a computer usable or readable storage device having stored thereon computer software (control logic) and/or data. Removable storage unit 1418 may be a floppy disk, magnetic tape, compact disk, DVD, optical storage disk, and/any other computer data storage device. Removable storage drive 1414 reads from and/or writes to removable storage unit 1418 in a well-known manner.

According to an exemplary aspect, secondary memory 1410 may include other means, instrumentalities or other approaches for allowing computer programs and/or other instructions and/or data to be accessed by computer system 1400. Such means, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1400 may further include a communication or network interface 1424. Communication interface 1424 enables computer system 1400 to communicate and interact with any combination of remote devices, remote networks, remote entities, etc. (individually and collectively referenced by reference number 1428). For example, communication interface 1424 may allow computer system 1400 to communicate with remote devices 1428 over communications path 1426, which may be wired and/or wireless, and which may include any combination of LANs, WANs, the Internet, etc. Control logic and/or data may be transmitted to and from computer system 1400 via communication path 1426.

In an aspect, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1400, main memory 1408, secondary memory 1410, and removable storage units 1418 and 1422, as well as tangible articles of manufacture embodying any combination of the foregoing. Such control logic, when executed by one or more data processing devices (such as computer system 1400), causes such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 14. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A method, comprising:

receiving, by a lidar detector during each lidar frame of N successive lidar frames, a respective reflected laser signal corresponding to a respective laser pulse emitted by a lidar emitter, wherein each received reflected laser signal is associated with a time bin of the respective lidar frame and with a pulse code offset applied to a respective laser signal emitted during that lidar frame;

aggregating, by one or more computing devices, the received reflected laser signal from the N successive lidar frames into an avalanche histogram of a data frame at a time bin of the avalanche histogram corresponding with the time bin of the N successive lidar frame, wherein the received reflected laser signal form a set of the received reflected laser signal having corresponding pulse code offset;

decoding, by the one or more computing devices, the set of received reflected laser signals by shifting each received reflected laser signal of the set of received reflected laser signals to a time bin of a decoded avalanche histogram based on the corresponding pulse code offset;

cyclically decoding, by the one or more computing devices, the set of the received reflected laser signals by shifting the each received reflected laser signal of the set of the received reflected laser signals to a time bin of a cyclically decoded avalanche histogram based on a cyclic remapping of the corresponding pulse code offsets; and computing, by the one or more computing devices, from the data frame, a distance of a target within a range from N*Rmax to (N+1)*Rmax based on a grouping of received reflected laser signals within the time bin of the cyclically decoded avalanche histogram, wherein Rmax is maximum distance for an in-range target detectable within the lidar frame for the reflected laser signal corresponding to the laser pulse emitted during that lidar frame, wherein each pulse code offset applied during a corresponding one of the N successive lidar frame is one pulse code offset of a sequence of N pulse cod offsets respectively applied over the N successive lidar frames, and wherein the sequence of N pulse code offsets is selected such that (i) a difference between successive offsets in the sequence, d(n)-d(n−1), is a different value for each n, and (ii) a subset of the set of the received reflected laser signals corresponding to a reflection from an out-of-range target resolves to scattered bins of the decoded avalanche histogram.

2. The method of claim 1, further comprising:

computing, by the one or more computing devices, a distance of a target based on a grouping of received reflected laser signals within a time bin of the decoded avalanche histogram.

3. The method of claim 1, wherein the cyclic remapping comprises:

cyclically permuting the sequence of N pulse code offsets such that decoding based on a first ordering of the sequence provides measurements in a first zone up to Rmax, and decoding based on a second cyclically related ordering of the sequence provides measurements in a second zone between Rmax and 2Rmax.

4. The method of claim 3, wherein decoding based on a third cyclically related ordering of the sequence provides measurements for targets in a third zone between 2Rmax and 3Rmax.

5. The method of claim 1, wherein the receiving further comprises:

disarming the lidar detector for a hold-off time duration, wherein the hold-off time duration includes an arm offset applied to a subsequent lidar frame, wherein the arm offset corresponds to an arm code that shifts a time window for arming the lidar detector during the subsequent lidar frame.

6. The method of claim 1, wherein the sequence of N pulse code offsets is selected to produce a diffuse, or spread-out, decoded histogram for out-of-range targets.

7. The method of claim 1, wherein the lidar detector comprises a single photon detector.

8. A system, comprising:

a lidar detector configured to receive, during each lidar frame of N successive lidar frames, a respective reflected laser signal corresponding to a respective laser pulse emitted by a lidar emitter, wherein each received reflected laser signal is associated with a time bin of a respective lidar frame and with a pulse code offset applied to the respective laser pulse emitted during that lidar frame;

a memory; and at least one processor coupled to the memory and configured to perform operations comprising:

aggregating the received reflected laser signals from the N successive lidar frames into an avalanche histogram of a data frame at time bins corresponding with the time bins of the N successive lidar frames, wherein the received reflected laser signals form a set of received reflected laser signals having corresponding pulse code offsets, decoding the set of received reflected laser signals by shifting each received reflected laser signal of the set of received reflected laser signals to a time bin of a decoded avalanche histogram based on the corresponding pulse code offset, cyclically decoding the set of received reflected laser signals by shifting each received reflected laser signal of the set of received reflected laser signals to a time bin of a cyclically decoded avalanche histogram based on a cyclic remapping of the corresponding pulse code offsets, and computing, from the data frame, a distance of a target within a range from Rmax to 2Rmax based on a grouping of received reflected laser signals within a time bin of the cyclically decoded avalanche histogram, wherein Rmax is a maximum distance for an in-range target detectable within a lidar frame for a reflected laser signal corresponding to a laser pulse emitted during that lidar frame, wherein each pulse code offset applied during a corresponding one of the N successive lidar frames is one pulse code offset of a sequence of N pulse code offsets respectively applied over the N successive lidar frames, and wherein the sequence of N pulse code offsets is selected such that (i) a difference between successive offsets in the sequence, d(n)-d(n−1), is a different value for each n, and (ii) a subset of the set of received reflected laser signals corresponding to a reflection from an out-of-range target resolves to scattered bins of the decoded avalanche histogram.

9. The system of claim 8, the operations further comprising:

computing a distance of a target based on a grouping of received reflected laser signals within a time bin of the decoded avalanche histogram.

10. The system of claim 8, wherein the cyclic remapping comprises:

cyclically permuting the sequence of N pulse code offsets such that decoding based on a first ordering of the sequence provides measurements in a first zone up to Rmax, and decoding based on a second cyclically related ordering of the sequence provides measurements in a second zone between Rmax and 2Rmax.

11. The system of claim 10, wherein decoding based on a third cyclically related ordering of the sequence provides measurements for targets in a third zone between 2Rmax and 3Rmax.

12. The system of claim 8, wherein the lidar detector is further configured to disarm for a hold-off time duration, wherein the hold-off time duration includes an arm offset applied to a subsequent lidar frame, wherein the arm offset corresponds to an arm code that shifts a time window for arming the lidar detector during the subsequent lidar frame.

13. The system of claim 8, wherein the sequence of N pulse code offsets is selected to produce a diffuse, or spread-out, decoded histogram for out-of-range targets.

14. A non-transitory computer-readable medium having instructions stored thereon that, when executed by a computing device, cause the computing device to perform operations comprising:

aggregating reflected laser signals corresponding to respective laser pulses emitted by a lidar emitter and received by a lidar detector during each lidar frame of N successive lidar frames into an avalanche histogram of a data frame at time bins corresponding with the time bins of the N successive lidar frames, wherein each received reflected laser signal is associated with a pulse code offset applied to the respective laser pulse emitted during the corresponding lidar frame, and wherein the received reflected laser signals form a set of received reflected laser signals having corresponding pulse code offsets;

decoding the set of received reflected laser signals by shifting each received reflected laser signal of the set of received reflected laser signals to a time bin of a decoded avalanche histogram based on the corresponding pulse code offset;

cyclically decoding the set of received reflected laser signals by shifting each received reflected laser signal of the set of received reflected laser signals to a time bin of a cyclically decoded avalanche histogram based on a cyclic remapping of the corresponding pulse code offsets; and computing, from the data frame, a distance of a target within a range from Rmax to 2Rmax based on a grouping of received reflected laser signals within a time bin of the cyclically decoded avalanche histogram, wherein Rmax is a maximum distance for an in-range target detectable within a lidar frame for a reflected laser signal corresponding to a laser pulse emitted during that lidar frame, wherein each pulse code offset applied during a corresponding one of the N successive lidar frames is one pulse code offset of a sequence of N pulse code offsets respectively applied over the N successive lidar frames, and wherein the sequence of N pulse code offsets is selected such that (i) a difference between successive offsets in the sequence, d(n)-d(n−1), is a different value for each n, and (ii) a subset of the set of received reflected laser signals corresponding to a reflection from an out-of-range target resolves to scattered bins of the decoded avalanche histogram.

15. The non-transitory computer-readable medium of claim 14, the operations further comprising:

computing a distance of a target based on a grouping of received reflected laser signals within a time bin of the decoded avalanche histogram.

16. The non-transitory computer-readable medium of claim 14, wherein the cyclic remapping comprises:

cyclically permuting the sequence of N pulse code offsets such that decoding based on a first ordering of the sequence provides measurements in a first zone up to Rmax, and decoding based on a second cyclically related ordering of the sequence provides measurements in a second zone between Rmax and 2Rmax.

17. The non-transitory computer-readable medium of claim 16, wherein decoding based on a third cyclically related ordering of the sequence provides measurements for targets in a third zone between 2Rmax and 3Rmax.

18. The non-transitory computer-readable medium of claim 14, the operations further comprising:

disarming the lidar detector for a hold-off time duration, wherein the hold-off time duration includes an arm offset applied to a subsequent lidar frame, wherein the arm offset corresponds to an arm code that shifts a time window for arming the lidar detector during the subsequent lidar frame.

19. The non-transitory computer-readable medium of claim 14, wherein the sequence of N pulse code offsets is selected to produce a diffuse, or spread-out, decoded histogram for out-of-range targets.

20. The non-transitory computer-readable medium of claim 14, wherein the lidar detector comprises a single photon detector.

* * * * *